United States Patent
Kim

(10) Patent No.: US 9,791,038 B2
(45) Date of Patent: Oct. 17, 2017

(54) CONTROL METHOD OF TRANSMISSION FOR VEHICLE AND CONTROL SYSTEM FOR THE SAME

(71) Applicant: Hyundai Motor Company, Seoul (KR)

(72) Inventor: Jong Eek Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/216,419

(22) Filed: Jul. 21, 2016

(65) Prior Publication Data

US 2017/0268664 A1    Sep. 21, 2017

(30) Foreign Application Priority Data

Mar. 16, 2016    (KR) .................. 10-2016-0031592

(51) Int. Cl.
*F16H 61/02*    (2006.01)
*F16H 59/18*    (2006.01)
(Continued)

(52) U.S. Cl.
CPC ......... *F16H 61/0213* (2013.01); *F16H 59/18* (2013.01); *F16H 59/44* (2013.01);
(Continued)

(58) Field of Classification Search
CPC ...... F16H 61/0213; F16H 59/18; F16H 59/44; F16H 59/48
See application file for complete search history.

(56) References Cited

U.S. PATENT DOCUMENTS

| | | | |
|---|---|---|---|
| 6,269,295 B1 * | 7/2001 | Gaugush | B60T 11/103 192/220.1 |
| 6,551,212 B2 * | 4/2003 | Skinner | B60W 10/06 192/220.1 |

(Continued)

FOREIGN PATENT DOCUMENTS

| | | |
|---|---|---|
| JP | 2001-254818 A | 9/2001 |
| JP | 2008-261440 A | 10/2008 |

(Continued)

*Primary Examiner* — Jacob S Scott
*Assistant Examiner* — Tinh Dang
(74) *Attorney, Agent, or Firm* — Morgan, Lewis & Bockius LLP

(57) ABSTRACT

A method of controlling a transmission for a vehicle may include performing deceleration intention determination, by a controller, of determining an intention of a driver for deceleration based on whether a brake pedal signal is received by the controller, upon determining that the driver intends to decelerate, performing downshift determination, by the controller, of determining an intention of the driver to use engine braking based on whether manual downshift of a shifter is performed by the driver, upon determining that the driver intends to use the engine braking, performing continuous shifting determination, by the controller, of determining whether the driver intends to implement maximum engine braking through continuous shifting, and upon determining that the driver has the intention to implement the maximum engine braking, performing continuous shifting, by the controller, of implementing maximum engine braking by shifting to a lowest gear implementable under a current driving condition.

9 Claims, 2 Drawing Sheets

(51) Int. Cl.
*F16H 59/48* (2006.01)
*F16H 59/36* (2006.01)
*F16H 59/44* (2006.01)
*F16H 59/40* (2006.01)

(52) U.S. Cl.
CPC ....... *F16H 59/48* (2013.01); *F16H 2059/366* (2013.01); *F16H 2059/405* (2013.01); *F16H 2061/0216* (2013.01)

(56) References Cited

U.S. PATENT DOCUMENTS

| | | | |
|---|---|---|---|
| 7,416,265 B2* | 8/2008 | Holt | B60T 13/662 |
| | | | 303/191 |
| 8,021,268 B2* | 9/2011 | Sawada | B60W 30/18109 |
| | | | 477/118 |
| 9,387,858 B2* | 7/2016 | Jeon | B60W 10/10 |

FOREIGN PATENT DOCUMENTS

| | | |
|---|---|---|
| JP | 2009-52723 A | 3/2009 |
| JP | 2009-156433 A | 7/2009 |
| KR | 10-2009-0028085 A | 3/2009 |
| KR | 10-2014-0030895 A | 3/2014 |
| KR | 10-2015-0074362 A | 7/2015 |

\* cited by examiner

CONTROL METHOD OF TRANSMISSION FOR VEHICLE AND CONTROL SYSTEM FOR THE SAME

CROSS-REFERENCE TO RELATED APPLICATION

The present application claims priority to Korean Patent Application No. 10-2016-0031592, filed Mar. 16, 2016, the entire contents of which is incorporated herein for all purposes by this reference.

BACKGROUND OF THE INVENTION

Field of the Invention

The present invention relates to a method of controlling a transmission for vehicles and a control system for the same, and more particularly, to a method of controlling a transmission for vehicles to assist a driver in downshifting through continuous shifting according to an intention of the driver, for implementation of engine braking in the automatic transmission, and a control system for the same.

Description of Related Art

A vehicle is provided with a transmission adapted to convert power generated from the engine into a necessary torque according to the vehicle speed and transmit the same. The engine of the vehicle produces maximum torque at a certain rotational speed thereof. In low-speed driving, a high torque and a low rotational speed are needed. In high-speed driving, a high rotational speed is more necessary than a high torque. The transmission corresponds to an apparatus to adjust the power of the engine such that the power can be realized as a required torque and rotational speed according to the driving state of the vehicle.

Regarding the transmission for vehicles, automation technology for automatically determining a drive gear according to the current driving conditions and performing gear shifting has been developed, and the number of drive gears has been increased to improve operational efficiency of the vehicle during driving.

For such automatic multi-stage gearshift transmission, the shifter thereof may be provided with a manual mode to allow the driver to manually change gears, and the driver may change gears as intended through manipulation of the manual mode of the shifter mechanism.

In shifting through the manual mode of the automatic transmission as described above, as the level difference between a target gear and a current gear increases, the number of times of manual downshifting in the shifter that should be performed by the driver may increase, which may cause inconvenience to the driver and increase time taken to change gears. This issue becomes particularly serious when quick braking is needed and thus maximum engine braking is implemented.

When multi-stage shifting needs to be performed as desired by the driver, quickly and conveniently shifting to a target gear by assisting the driver is an important challenge in controlling the automatic transmission.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a control method and system of a transmission capable of effectively implementing maximum engine braking by effectively determining the intention of a driver for deceleration and performing continuous shifting according to manipulation of a shifter by the driver.

According to various aspects of the present invention, a method of controlling a transmission for a vehicle may include performing deceleration intention determination, by a controller, of determining an intention of a driver for deceleration based on whether a brake pedal signal is received by the controller, upon determining that the driver intends to decelerate in the deceleration intention determination, performing downshift determination, by the controller, of determining an intention of the driver to use engine braking based on whether manual downshift of a shifter is performed by the driver, upon determining that the driver intends to use the engine braking in the downshift determination, performing continuous shifting determination, by the controller, of determining whether the driver intends to implement maximum engine braking through continuous shifting based on whether a duration of the manual downshift of the shifter is longer than a reference time, and upon determining that the driver has the intention to implement the maximum engine braking in the continuous shifting determination, performing continuous shifting, by the controller, of implementing maximum engine braking by shifting to a lowest gear implementable under a current driving condition.

The deceleration intention determination may include determining whether the driver intends to decelerate based on whether the brake pedal signal is received by the controller and whether a depression amount of an accelerator pedal is less than or equal to a reference depression amount.

The method may further include, upon determining in the deceleration intention determination that the driver intends to decelerate, performing deceleration determination, by the controller, of determining whether the vehicle is decelerating based on whether a vehicle speed change rate of the vehicle is less than or equal to a reference vehicle speed change rate, in which the downshift determination may include upon determining that the vehicle is decelerating in the deceleration determination, determining whether the driver intends to use the engine braking.

The deceleration determination may include determining, by the controller whether the vehicle is decelerating based on whether the vehicle speed change rate of the vehicle is less than or equal to the reference vehicle speed change rate, and determining, by the controller, whether a rotational speed change rate of an output shaft of the transmission is less than or equal to a reference rotational speed change rate.

The continuous shifting may include determining, by the controller, the lowest gear implementable, taking current rotations per minute (RPM) of an engine as the driving condition.

The continuous shifting, may include determining, by the controller, the lowest gear such that increased RPM of the engine expected according to continuous shifting is lower than or equal to a reference RPM.

The continuous shifting may include determining, by the controller, the lowest gear implementable, taking a current vehicle speed of the vehicle as the driving condition.

The continuous shifting may include determining, by the controller, a lowest currently implementable gear through a data map, the data map storing the lowest gear implementable through the continuous shifting determined according to a gear and a vehicle speed range.

According to various aspects of the present invention, a control system for a transmission for vehicles may include a depression sensor to measure depression states of a brake pedal and an accelerator pedal, a speed sensor to measure a vehicle speed and a rotational speed of an output shaft of the transmission, a shifter for implementation of a shift range and manual downshift of the transmission, and a controller configured to determine whether a brake pedal signal is received and whether a depression amount of the accelerator pedal is less than or equal to a reference depression amount, determine whether manual downshift of the shifter is performed, determine whether a duration of maintaining the manual downshift of the shifter is longer than or equal to a reference time, and implement maximum engine braking by performing continuous shift to a lowest gear of the transmission implementable under current driving conditions.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
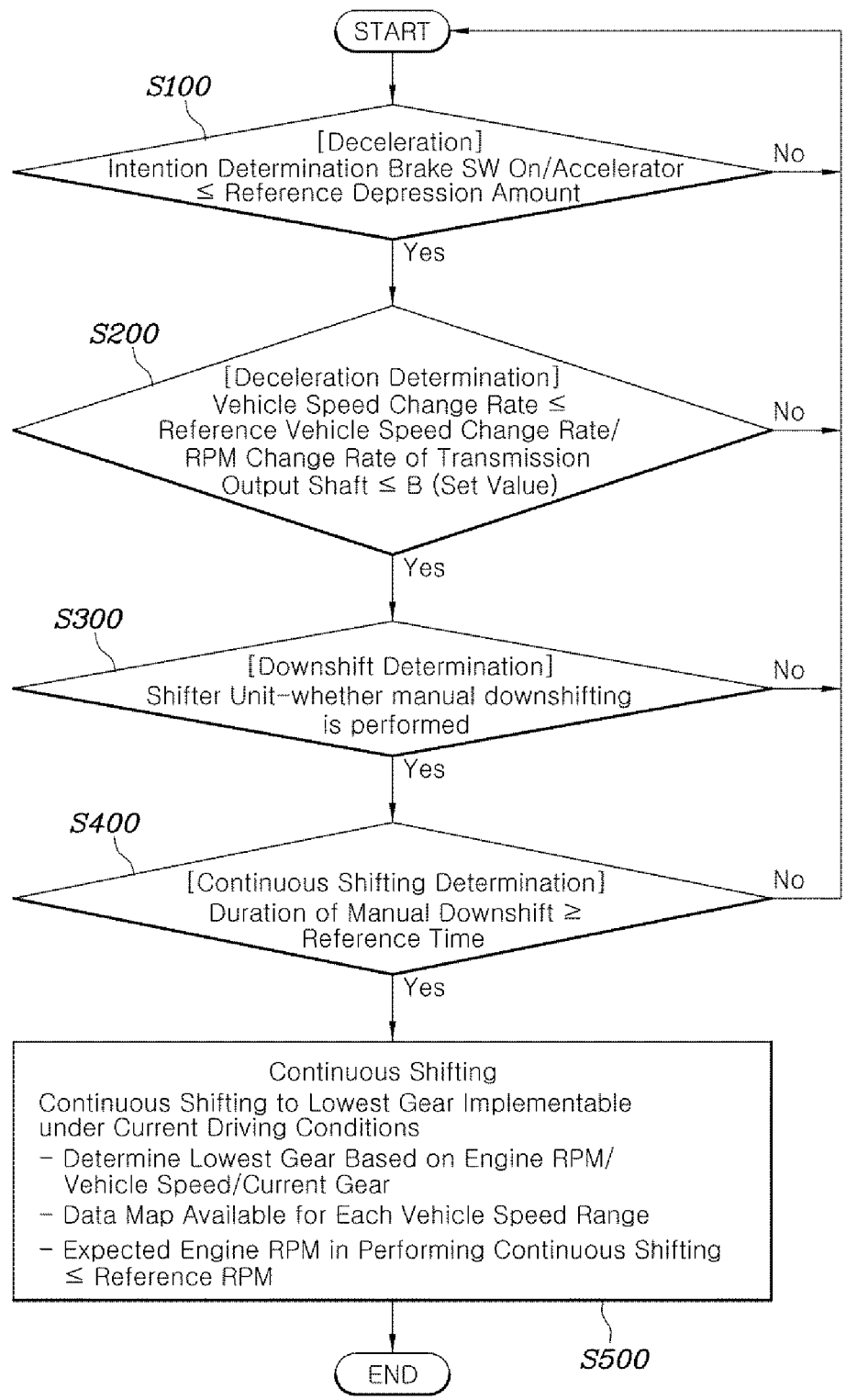
FIG. 1 is a flowchart illustrating a method of controlling a transmission for vehicles according to various embodiments of the present invention.
Figure 2:
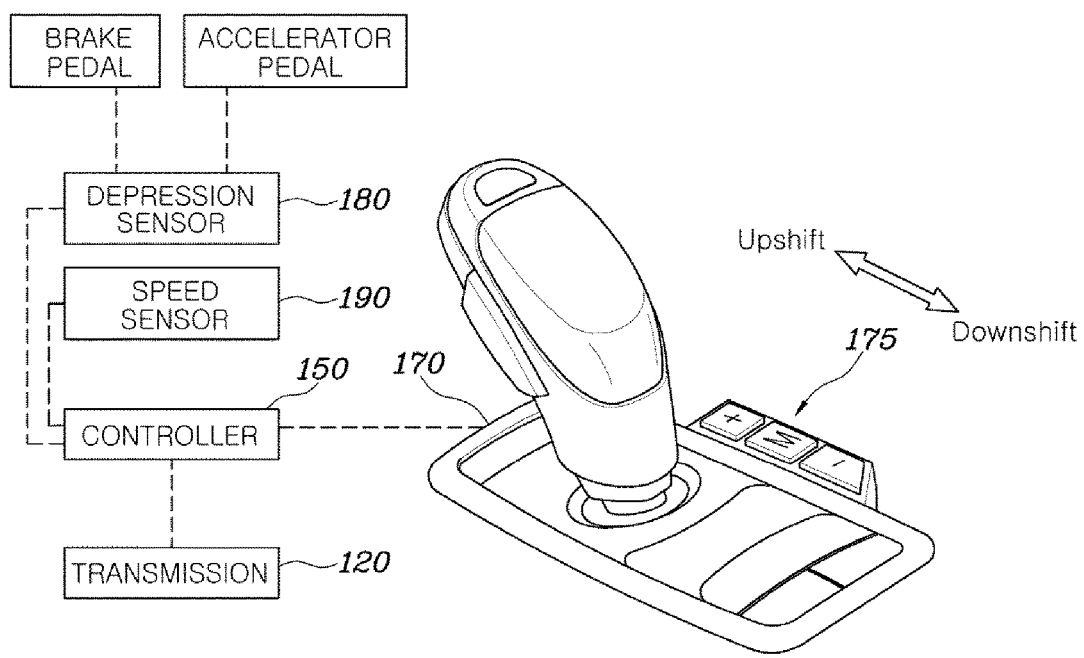
FIG. 2 is a view illustrating a control system for the transmission for vehicles according to various embodiments of the present invention.

As shown in FIGS. 1 and 2, a method of controlling a transmission for vehicles includes performing deceleration intention determination, by a controller, of determining an intention of a driver for deceleration based on whether a brake pedal signal is received (S100), upon determining that the driver intends to decelerate in the deceleration intention determination (S100), performing downshift determination, by the controller, of determining an intention of the driver to use engine braking based on whether manual downshift of a shifter 170 is performed by the driver (S300). The method further includes upon determining that the driver intends to use engine braking in the downshift determination (S300), performing continuous shifting determination, by the controller, of determining whether the driver intends to implement maximum engine braking through continuous shifting based on whether the duration of the manual downshift of the shifter 170 is longer than or equal to a reference time (S400), and upon determining that the driver intends to implement maximum engine braking in the continuous shifting determination (S400), performing continuous shifting, by the controller, of implementing maximum engine braking by shifting to the lowest gear implementable under current driving conditions (S500).

Specifically, in the deceleration intention determination (S100), the controller determines the intention of the driver for deceleration based on whether the brake pedal signal is received.

When the brake pedal is depressed by the driver, a corresponding signal is transmitted to the controller through a depression sensor of the brake pedal, and the controller receiving the signal determines that the driver intends to decelerate. To this end, the controller is connected to a sensor provided to the brake pedal to communicate signals.

In the downshift determination (S300), upon determining that the driver intends to decelerate in the deceleration intention determination (S100), the controller determines whether the driver intends to use engine braking based on whether manual downshift of the shifter 170 is performed by the driver.

The shifter 170 is manipulated by the driver in the vehicle, and transmits a manipulation signal corresponding to manipulation of the driver to the controller such that control of a transmission 120 is performed according to the signal.

For the automatic transmission 120, once the shifter 170 is shifted to the drive range, a drive gear is automatically selected according to the driving condition of the vehicle. Such automatic transmission 120 may be provided with a manual mode 175 to allow the driver to select a gear.

Hereinafter, a description will be given of various embodiments of providing the manual mode 175, which are intended to facilitate manual operation of the automatic transmission 120 by the driver, and the shifter 170, which is intended to enable upshifting and downshifting.

When the driver manually downshifts using the shifter 170, the shifter 170 transmits a corresponding signal to the controller. Then, the controller determines an intention of the driver for deceleration in the deceleration intention determination (S100), and then determines, if a manual downshift signal of the shifter 170 is received, that the driver intends to use engine braking.

In the continuous shifting determination (S400), upon determining that the driver intends to use the engine braking in the downshift determination (S300), the controller determines an intention of the driver to implement maximum engine braking through a shift change based on whether the duration of manual downshift of the shifter 170 is longer than or equal to a reference time.

If the driver performs manual downshift in a typical situation, the operation is not maintained or is maintained no more than a certain time. According to various embodiments, it is determined whether the driver maintains manual downshift of the shifter 170 for a certain time to implement maximum engine braking.

If the driver manually downshifts, but does not maintain the downshift operation for more than a reference time, it may be determined that the driver intends to shift to a lower gear. If the downshift operation is maintained for more than the reference time, the controller determines that the driver intends to implement maximum engine braking rather than typical downshift.

The reference time for the duration of the manual downshift may be pre-stored in the controller and various values may be determined as the reference time. To distinguish the intention for implementation of the maximum engine braking from the intention for the typical downshift, the reference time is set to be longer than the time taken to perform typical manual downshift.

In the continuous shifting (S500), upon determining that the driver intends to implement the maximum engine braking in the continuous shifting determination (S400), the controller implements the maximum engine braking by performing shift to the lowest gear implementable under current driving conditions.

Upon determining that the driver intends to implement the maximum engine braking by determining the manual downshift condition of the driver, the controller controls the transmission 120 or transmits a signal to another controller configured to control the transmission 120 to shift to the lowest gear currently implementable in the transmission 120.

When shift to the lowest gear occurs, shift occurs continuously from the current gear to the lowest gear. Through this procedure, maximum engine braking is implemented in the vehicle.

The lowest gear implementable according to the driving condition of the vehicle may be determined based on the current gear, vehicle speed and engine RPM. Particularly, the engine has a limited allowable driving range, and the controller 150 determines the lowest gear such that the engine operates within an allowable range according to continuous shifting.

Once it is determined that the driver intends to decelerate, intends to use engine braking, and intends to perform continuous shifting for implementation of the maximum engine braking, continuous shift to the lowest gear allowable under current driving conditions may be performed to implement maximum engine braking. Thereby, the driver may be prevented from unnecessarily repeating manipulation of the shifter 170 to implement maximum engine braking, and time taken to manipulate the shifter 170 and time taken to perform shift change may be minimized. Thereby, the maximum engine braking may be implemented in a short time even in a situation where fast deceleration is required, and thus manipulation performance of the vehicle may be improved.

As shown in FIGS. 1 and 2, according to the method of controlling a transmission for vehicles according to various embodiments of the present invention, the intention of the driver for deceleration is determined based on whether a brake pedal signal is received and whether a depression amount of the accelerator pedal is less than or equal to a reference depression amount.

Specifically, in a driving situation, the driver may step on the brake pedal while stepping on the accelerator pedal. In this case, to accurately and reliably determine the intention of the driver for deceleration, the controller 150 not only determines a depression signal of the brake pedal, but also determines whether the depression amount of the accelerator pedal is less than or equal to a reference depression amount.

That is, by determining not only the depression signal but also whether the depression amount of the accelerator pedal is less than or equal to the reference depression amount, whether the driver intends to decelerate may be reliably determined, excluding incorrect manipulation by the driver, malfunction of the brake pedal sensor or a special driving situation of the driver.

The driver stepping on the accelerator pedal to maintain driving may suddenly move the foot away from the accelerator pedal as fast deceleration is needed. On the other hand, a tiny depression amount of the accelerator may remain mechanically. Accordingly, determination of the intention of the driver for deceleration through the accelerator pedal is based on the depression amount of the accelerator pedal.

In this case, the reference depression amount may be determined through statistical or experimental analysis. According to various embodiments, the reference depression amount may be determined as 1% of the maximum depression amount. If the current depression amount of the accelerator pedal is less than or equal to the reference depression amount, and the controller 150 receives a brake pedal signal, it may be determined that the driver intends to decelerate.

As shown in FIGS. 1 and 2, the method of controlling a transmission for vehicles further includes performing deceleration determination (S200), by the controller 150, of determining whether the vehicle is decelerating based on whether the vehicle speed change rate of the vehicle is less than or equal to a reference vehicle speed change rate, upon determining in the deceleration intention determination (S100) that the driver intends to decelerate. Once it is determined that the vehicle is decelerating in the deceleration determination (S100), whether the driver intends to use engine braking is determined in the downshift determination (S300).

Specifically, the controller 150 determines the intention of the driver for deceleration in the deceleration intention determination (S100), and then performs the deceleration determination (S200) to determine whether the vehicle is actually decelerating.

In the deceleration determination (S200), whether the vehicle is decelerating is determined based on whether the vehicle speed change rate is less than or equal to a reference vehicle speed change rate. Various values may be determined as the reference vehicle speed change rate.

Thereby, even if a signal of the brake pedal or the accelerator instantaneously satisfies the criterion of the deceleration intention determination (S100) in a situation of malfunction of the pedal or a special situation, a case where the maximum engine braking need not be implemented as the vehicle is not actually decelerating may be excluded. Thereby, reliability of the present invention may be improved.

As shown in FIGS. 1 and 2, according to the method of controlling a transmission for vehicles according to various embodiments of the present invention, the controller 150 determines whether the vehicle is decelerating in the deceleration determination (S200), based on whether the vehicle speed change rate of the vehicle is less than or equal to the reference vehicle speed change rate and whether the rotational speed change rate of the output shaft of the transmission is less than or equal to a reference rotational speed change rate.

The speed of the vehicle may be collected using the rotational speeds of the wheels or GPS information. According to various embodiments of the present invention, in case that such information contains an error, whether the vehicle is decelerating is determined based on the rotational speed change rate of the output shaft of the transmission in addition to the vehicle speed change rate.

The rotational speed of the output shaft of the transmission substantially increases or decreases in proportion to the travel speed of the vehicle, and accordingly whether the vehicle is decelerating can be determined based on the rotational speed change rate of the output shaft of the transmission.

Similar to the reference vehicle speed change rate, the reference rotational speed change rate for the rotational speed change rate of the output shaft of the transmission may be determined differently according to various criteria.

As shown in FIGS. 1 and 2, according to the method of controlling a transmission for vehicles according to various embodiments of the present invention, the controller 150 determines the lowest implementable gear in the continuous shifting (S500), taking the current RPM of the engine as the driving condition.

As described above, in implementing the maximum engine braking through continuous shifting in the present invention, the lowest gear which is a target gear is determined such that the operation of the engine is maintained within an allowable range.

Particularly, an RPM region in which the engine is operable is predetermined. When gearshift occurs, the engine RPM may increase or decrease at the same vehicle speed. In particular, when downshifting is performed to implement engine braking, the engine RPM increases according to gearshift.

Thereby, when continuously shifting to a lower gear, it is important to ensure that the increased engine RPM is within the allowable range of design in determining the lowest gear.

That is, by determining the lowest allowable gear of the vehicle based on the engine RPM at the current gear, the engine may be prevented from being overloaded, and a gear capable of implementing maximum engine braking may be determined.

As shown in FIGS. 1 and 2, according to the method of controlling a transmission for vehicles according to various embodiments, the controller 150 determines the lowest gear in the continuous shifting (S500) such that the increased RPM of the engine expected according to continuous shifting is lower than or equal to a reference RPM.

As described above, the allowable RPM range of the engine of the vehicle is predetermined, and it is important that the RPM of the engine increasing according to shift to a lower gear is maintained within the allowable range.

Thereby, the controller 150 calculates expected increased RPM of the engine according to shift change based on the current gear and the current engine RPM, and determines the lowest gear such that the expected RPM is lower than or equal to the reference RPM.

Herein, the reference RPM is determined to be the maximum allowable RPM of the engine or RPM lower than the maximum RPM by a certain level. It is apparent that there are various ways to determine the reference RPM and various values for the reference RPM.

According to the method of determining the lowest gear as described above, repeated downshifting by the driver is prevented from being performed without consideration of the engine load, and optimum shift change may be performed. In addition, load to the vehicle may be reduced and maximum engine braking may be implemented.

As shown in FIGS. 1 and 2, according to the method of controlling a transmission for vehicles according to various embodiments, the controller 150 determines the lowest implementable gear, taking the current vehicle speed as the driving condition in the continuous shifting (S500).

A core factor which needs to be considered in continuous downshifting for engine braking may be load to the engine. Determination of the limit of the engine may be performed based on the vehicle speed.

That is, if the current gear and the vehicle speed are known, the operating conditions of the engine including the engine RPM may be determined, and thus the lowest gear which is a target gear for implementation of the maximum engine braking may be determined based on the determined operating conditions.

In addition, if the vehicle speed forms the basis of recognizing the operating conditions of the engine including the engine RPM, the corresponding information may be more conveniently and easily collected. Thereby, determination of the lowest gear may be standardized and stably performed.

As shown in FIGS. 1 and 2, according to the control method for a vehicle according to various embodiments, the controller 150 determines the lowest currently implementable gear through a data map in which the lowest gear implementable through the continuous shifting is determined and stored according to the gear and vehicle speed range.

Specifically, the controller 150 may determine the lowest gear by directly calculating hardware limits including the current gear, the vehicle speed and the engine. According to various embodiments, a data map in which the lowest gear is determined according to the gear and the vehicle speed may be pre-stored in the controller 150, and the controller 150 may determine the lowest currently implementable gear by matching the current driving information with the data map.

Determining the lowest currently implementable gear using the data map may prevent time delay which may occur for calculation of the lowest gear and also prevent an error from occurring during calculation.

Particularly, the data map may provide vehicle speed sections and the lowest gear may be determined for each section. Thereby, determining the lowest gear may be further simplified. The vehicle speed sections may be determined differently.

As shown in FIG. 2, a control system for the transmission for vehicles according to various embodiments of the present invention includes a depression sensor 180 to measure depression states of the brake pedal and accelerator pedal, a speed sensor 190 to measure a vehicle speed and a rotational speed of an output shaft of the transmission, a shifter 170 configured to enable implementation of a shift range and manual downshift of the transmission 120, and a controller 150 configured to determine whether a brake pedal signal is received and whether a depression amount of the accelerator pedal is less than or equal to a reference depression amount, determine whether manual downshift of the shifter 170 is performed, determine whether a duration of maintaining the manual downshift of the shifter 170 is longer than or equal to a reference time, and implement maximum engine braking by performing continuous shift to the lowest gear of the transmission 120 implementable under current driving conditions.

Specifically, the depression sensor 180 may be provided to each pedal to measure the depression states of the brake pedal and accelerator pedal, and is configured to measure whether the pedals are depressed and to measure the depression amounts of the pedals. In addition, the depression sensor 180 is configured to transmit signals for the depression states to the controller 150.

The speed sensor 190 measures the vehicle speed and the rotational speed of the output shaft of the transmission. Vehicle speed sensors for measurement of the vehicle speed may be provided to the wheels of the vehicle, and a sensor for measurement of the rotational speed of the output shaft of the transmission may be provided to the output shaft of the transmission. Various types of sensors may be used as the aforementioned sensors, and each sensor may be configured to transmit a sensor value to the controller 150.

The shifter 170 is configured to enable implementation of a shift range of the transmission 120 and manual downshift. The shifter 170 may be provided in the vehicle and be set to park (P), reverse (R), drive (D) and range (N), or the like. In particular, the shifter 170 is provided with a manual mode 175 to enable manual upshift or downshift. The shifter 170 is manipulated by the driver and is configured to transmit a signal to the controller 150 according to manipulation of the driver.

The controller 150 is configured to determine whether a brake pedal signal is received and whether the depression amount of the accelerator pedal is less than or equal to a reference depression amount, whether manual downshift is performed in the shifter 170, and whether the duration of the manual downshift of the shifter 170 is longer than or equal to a reference time, and to implement maximum engine braking by performing continuous shifting to the lowest gear implementable under the current driving conditions.

The controller 150 may be implemented as a transmission controller for control of the transmission 120 or as a separate controller configured to transmit and receive signals to and from the transmission 120.

As is apparent from the above description, according to a method of controlling a transmission for vehicles configured as described above and a control system for the same, maximum engine braking may be effectively implemented by effectively determining the intention of a driver for deceleration and performing continuous shifting according to manipulation of the shifter by the driver.

In particular, the intention of the driver for deceleration may be effectively determined by determining the depression statuses of the brake pedal and accelerator pedal, and whether the vehicle is decelerating may be effectively determined based on the vehicle speed and the rotational speed of the output shaft of the transmission.

In addition, the intention of the driver to use engine braking may be determined based on whether the driver downshifts in the manual mode of the shifter mechanism, and the intention of the driver to implement maximum engine braking may be effectively recognized by identifying the duration of the downshift operation.

When continuous shifting is performed to implement maximum engine braking, the lowest gear allowable by the engine may be determined in consideration of the current driving conditions including the vehicle speed, the engine RPM and the current gear. Thereby, maximum engine braking matching with the intention of the driver may be implemented.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling a transmission for a vehicle, the method comprising:
    performing deceleration intention determination, by a controller, of determining an intention of a driver for deceleration based on whether a brake pedal signal is received by the controller;
    upon determining that the driver intends to decelerate in the deceleration intention determination, performing downshift determination, by the controller, of determining an intention of the driver to use engine braking based on whether manual downshift of a shifter is performed by the driver;
    upon determining that the driver intends to use the engine braking in the downshift determination, performing continuous shifting determination, by the controller, of determining whether the driver intends to implement maximum engine braking through continuous shifting based on whether a duration of the manual downshift of the shifter is longer than or equal to a reference time; and
    upon determining that the driver has the intention to implement the maximum engine braking in the continuous shifting determination, performing continuous shifting, by the controller, of implementing the maximum engine braking by shifting to a lowest gear implementable under a current driving condition.

2. The method according to claim 1, wherein the deceleration intention determination comprises determining whether the driver intends to decelerate based on whether the brake pedal signal is received by the controller and whether a depression amount of an accelerator pedal is less than or equal to a reference depression amount.

3. The method according to claim 1, further comprising:
    upon determining in the deceleration intention determination that the driver intends to decelerate, performing deceleration determination, by the controller, of determining whether the vehicle is decelerating based on whether a vehicle speed change rate of the vehicle is less than or equal to a reference vehicle speed change rate,
    wherein the downshift determination comprises:
        upon determining that the vehicle is decelerating in the deceleration determination, determining whether the driver intends to use the engine braking.

4. The method according to claim 3, wherein the deceleration determination comprises:
    determining, by the controller whether the vehicle is decelerating based on whether the vehicle speed change rate of the vehicle is less than or equal to the reference vehicle speed change rate; and determining, by the controller, whether a rotational speed change rate of an output shaft of the transmission is less than or equal to a reference rotational speed change rate.

5. The method according to claim 1, wherein the continuous shifting comprises determining, by the controller, the lowest gear implementable, taking current rotations per minute (RPM) of an engine as the driving condition.

6. The method according to claim 5, wherein the continuous shifting comprises determining, by the controller, the lowest gear such that increased RPM of the engine expected according to continuous shifting is lower than or equal to a reference RPM.

7. The method according to claim 1, wherein the continuous shifting comprises determining, by the controller, the lowest gear implementable, taking a current vehicle speed of the vehicle as the driving condition.

8. The method according to claim 7, wherein the continuous shifting comprises determining, by the controller, a lowest currently implementable gear through a data map, the data map storing the lowest gear implementable through the continuous shifting determined according to a gear and a vehicle speed range.

9. A control system for a transmission for a vehicle, the control system comprising:
- a depression sensor to measure depression states of a brake pedal and an accelerator pedal;
- a speed sensor to measure a vehicle speed and a rotational speed of an output shaft of the transmission;
- a shifter for implementation of a shift range and manual downshift of the transmission; and
- a controller configured to:
  - determine whether a brake pedal signal is received and whether a depression amount of the accelerator pedal is less than or equal to a reference depression amount;
  - determine whether manual downshift of the shifter is performed;
  - determine whether a duration of maintaining the manual downshift of the shifter is longer than or equal to a reference time; and
  - implement maximum engine braking by performing continuous shift to a lowest gear of the transmission implementable under current driving conditions.

* * * * *